July 16, 1946.　　　　E. A. LOBACK　　　　2,403,936
AIRCRAFT
Filed March 11, 1944　　　3 Sheets-Sheet 2
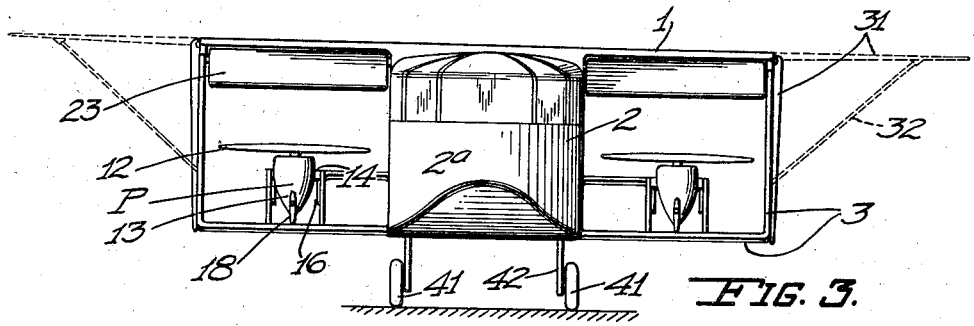
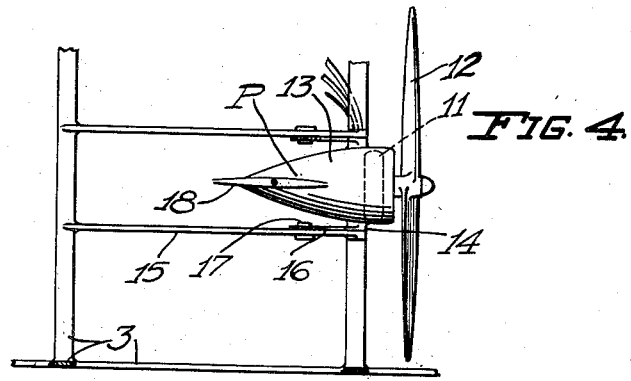
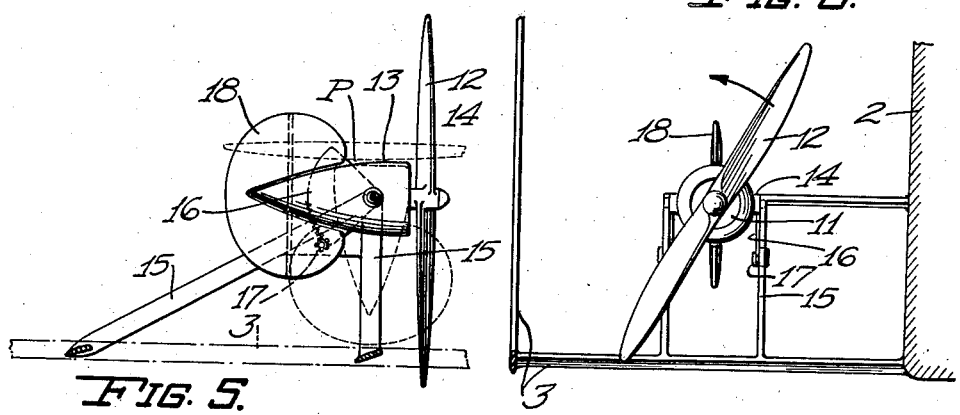
INVENTOR
EDGAR A. LOBACK.
BY
William E Hall
ATTORNEY.

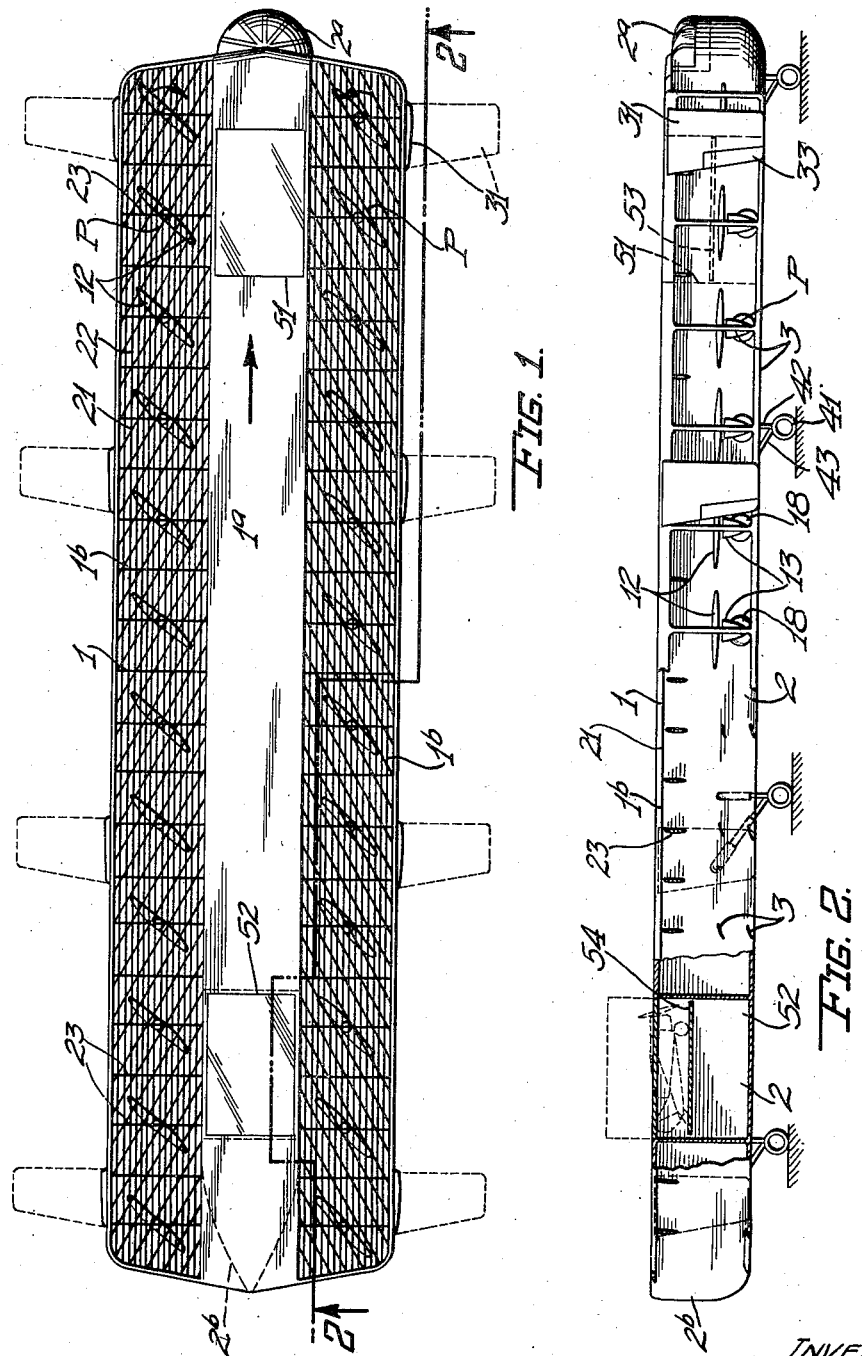

July 16, 1946.  E. A. LOBACK  2,403,936
AIRCRAFT
Filed March 11, 1944  3 Sheets-Sheet 3

INVENTOR
EDGAR A. LOBACK
BY
*William C. Hall*
ATTORNEY

Patented July 16, 1946

2,403,936

UNITED STATES PATENT OFFICE 2,403,936

AIRCRAFT

Edgar A. Loback, New York, N. Y.

Application March 11, 1944, Serial No. 526,013

11 Claims. (Cl. 244—6)

My invention relates to aircraft, and particularly to heavier types of aircraft.

One of the principal objects of this invention is to provide a large aircraft which may be raised substantially vertically from the ground or other landing surface, and which may be directed into horizontal flight when the desired altitude is attained, and further provide such an aircraft in which the vertical, angular, or horizontal direction of flight is attained by the corresponding direction of movement of the propelling means, or a portion thereof.

Another important object of this invention is to provide shiftable airfoils to facilitate the sustaining of the aircraft in the air when substantially horizontal flight is desired, and in which the airfoils are directed upwardly, or substantially so, when vertical ascent is desired.

An important object also of this invention is to provide auxiliary wings for an aircraft of this class, in which the wings may extend considerable distances laterally to facilitate sustaining the aircraft in the air during horizontal flight, and to increase and control its lateral stability, and further in which such wings are foldable downwardly against the sides of the craft when not used for horizontal flight.

A further important object of this invention is to provide power units, including propelling motors and propellers, in which the axes of the propellers may be readily shifted from vertical or upright positions to forwardly directed positions, or any positions intermediate such extremes, for the purpose of obtaining vertical or substantially vertical ascent or propulsion in a forward direction.

A still further important object of this invention is to provide a novel rudder means on such power and propelling units whereby the aircraft may be directed laterally in its ascent or descent, and also whereby the aircraft may be controlled directionally when the propelling units are shifted forwardly or horizontally.

An object also of this invention is to provide propelling units of this class with control rudders, and in which the control rudders on the propelling units at the fore and aft ends of the aircraft may be operated in different directions so as to obtain rapid directional control.

Still another important object of this invention is to provide a relatively long and narrow aircraft of this class having a foraminous or reticulated upper deck, or plane surface at the top of the aircraft, from which smaller aircraft may readily take off and on which they may readily alight.

An important feature of this invention in adapting the aircraft for the purposes mentioned is the construction of the foraminous upper deck so that a minimum of head resistance is encountered in either vertical ascent or horizontal flight.

Still another important object of this invention is to provide a novelly constructed under carriage means for aircraft of this class, which may be readily retracted and also readily shifted into landing position.

With these and other objects in view, as will appear hereinafter, I have devised an aircraft having certain novel features of construction, combination, and arrangement of parts and portions, as will be hereinafter described in detail, and particularly set forth in the appended claims, reference being had to the accompanying drawings, and to the characters of reference thereon, which form a part of this application, in which:

Fig. 1 is a plan view of an aircraft incorporating the various features of my invention, showing by dotted lines the wings extended for horizontal flight;

Fig. 2 is a partial side and partial sectional elevational view thereof, taken at 2—2 of Fig. 1;

Fig. 3 is an enlarged partial front and partial sectional elevational view thereof, taken through 3—3 of Fig. 1;

Figure 7:
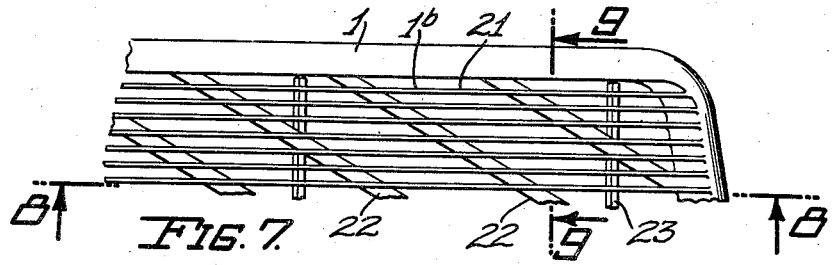
Figure 8:
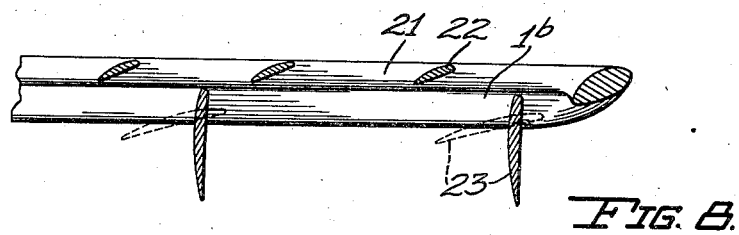
Figure 9:
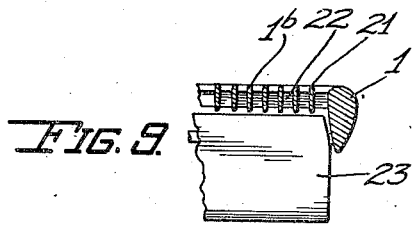
Figure 10:
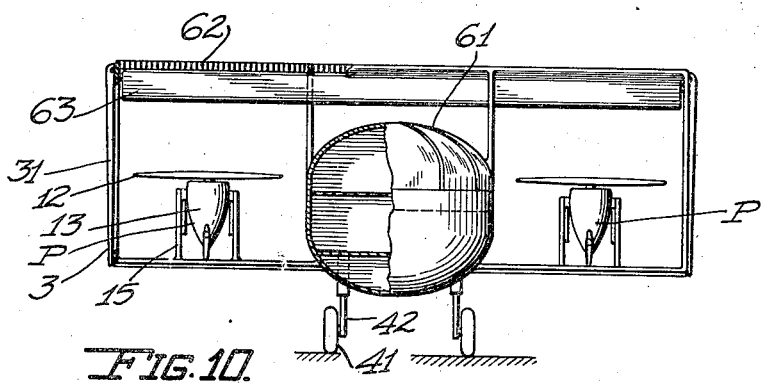

Figs. 4, 5, and 6 are, respectively, enlarged and fragmentary plan, side and front views of the propelling units used in my aircraft and showing the same shifted for horizontal flight;

Fig. 7 is an enlarged fragmentary plan view of one corner of the upper deck of my aircraft, showing the foraminous or reticulated construction thereof for the purposes above mentioned;

Fig. 8 is a longitudinal sectional view thereof, taken through 8—8 of Fig. 7, showing by dotted lines the airfoils shifted to slightly angular positions during horizontal flight;

Fig. 9 is a fragmentary transverse sectional view thereof, taken through 9—9 of Fig. 7; and, Fig. 10 is a front view, similar to that shown in Fig. 3 of a slightly modified form of construction.

The aircraft shown in the drawings is of a relatively large type, such as may be used in carrying freight, one adapted for carrying aircraft for the purpose of launching and receiving them on the sustaining plane or deck thereof, or for other like purposes.

In the drawings, the length is approximately four times the width, and the width about three times the height. As shown, the middle portion of the upper plane surface or deck 1 is a solid plane surface, designated 1a, while the portions, designated 1b, of this plane surface or deck, at the opposite sides of the solid middle strip 1a, are foraminous or reticulated, as will be hereinafter described. From the solid middle strip 1a is suspended the body 2, which is in the form of a long cabin, the front end 2a of which is preferably rounded, while the rear end is streamlined as indicated by 2b.

At the opposite sides of the cabin is a structural frame work, designated 3. On this frame work is supported a plurality of propelling units P. These propelling units are arranged behind each other from the front to the rear end of the aircraft, and are spaced from the cabin and also below the plane surface or deck 2.

Each propelling unit is shown as consisting of a radial engine 11 having a propeller 12 secured to the shaft of the engine, and the engine as enclosed within a streamlined engine housing 13. The propelling unit is provided with trunnions 14 which are arranged on a horizontal axis transverse to the longitudinal axis of the aircraft. The trunnions are pivotally supported on spaced apart brackets 15 carried by the frame 3. The housing is provided at its opposite sides with gear quadrants 16 which are arranged circularly about the axis of the trunnions. Both quadrants may be operated by motor controlled pinions 17 carried on the brackets 15 so that the rotating axis of the motor and the propeller may be readily shifted from horizontal positions, shown in Figs. 4, 5, and 6, to vertical positions, shown in Figs. 2 and 3, or to any intermediate positions. At the rear ends of each housing 13 is provided a rudder 18 which is arranged on an axis transverse to the rotating axis of the motor and propeller. This pivotal axis of the rudder assumes a vertical position, as shown in Figs. 4 and 5, and a horizontal position, as shown in Fig. 2. The rudders 18 on the propelling units serve to move the aircraft laterally when the propellers are directed upwardly and they serve to move the aircraft directionally when the propellers are shifted forwardly. The directional control of the aircraft is attained by the shifting of any one or more of the rudders of the propelling units.

The trunnions 14 are hollow so that the fuel conduits, the ignition wires for the motor, and the fluid or other control conduit for the rudders, may be readily conducted to the various portions of the structure carried by the trunnions.

In Fig. 1 a portion of the plane surface or deck 1 is shown as foraminous or reticulated so that the air may pass freely therethrough when the aircraft ascends vertically or substantially so. This portion of the deck, designated 1b, consists of longitudinal members 21 which are placed on edge, and preferably sufficiently close that airplane wheels may pass readily thereover. These longitudinal members 21 are reinforced laterally with respect to each other by reinforcing members 22 which are shown as arranged diagonally. These reinforcing members are also relatively wide and positioned at an angle with the horizontal plane so that they offer as little resistance as possible to the vertical ascent of the aircraft, and also add to the lift of the aircraft, when passing horizontally through the air.

Below the reticulated deck are mounted airfoils 23. These airfoils are pivoted near their forward or upper edges on horizontal axes which are also arranged transversely with respect to the longitudinal axis of the aircraft. When the aircraft ascends vertically, the airfoils are arranged in upright positions, as shown by solid lines in Fig. 8, and at an angle, as shown by dotted lines in Fig. 8, when the aircraft is moving horizontally.

Along both sides of the deck of the aircraft are arranged wings 31, which are extended during horizontal flight, as shown by dotted lines in Figs. 1 and 3, or which may be folded downwardly, as shown by solid lines in Figs. 2 and 3. These wings or wing sections are hinged at their inner ends on axes which are parallel to the longitudinal axis of the aircraft, and the length thereof is such that when the wings are folded or collapsed downwardly they do not extend below the frame 3. These wings may be supported in horizontal positions by cables 32, or other similar means. Appropriate means (not shown) may be provided for laterally extending the wings, if desired. The length of the cables 32, of course, may be controlled by suitable winches or similar means (not shown). Near the outer ends of the rear edges of the wings may be provided ailerons 33 to facilitate the control of the lateral stability of the craft.

The aircraft is preferably provided with wheels 41 to facilitate landing, take-off, or transportation of the same. These wheels are arranged at the opposite lateral sides of the cabin or body 2. The wheels 41 are shown mounted at the lower ends of telescoping supports 42, which are pivoted at their upper ends on the body. The wheels are shifted to and held in their landing positions by hydraulic rams or similar mechanism 43, which are pivoted at their forward ends to the lower portions of the supports 42 and at their upper rear ends on the body. The rams 43 are arranged to cause retraction of the wheels of the under carriages into suitable compartments of the body.

When the craft is desired to be used as an airplane carrier, there are preferably provided near the front and rear ends of the cabin elevator shafts 51 and 52 in which operate elevators 53 and 54, respectively, whereby aircraft may be carried into and from the intermediate portion of the cabin.

It will be here noted that when the aircraft shown is in horizontal flight, the same may move at considerable speed, thereby reducing considerably the relative landing speed of the airplanes on the deck. When in horizontal flight, air passes downwardly through the reticulated portion of the deck and thereby facilitating the drawing of the airplane toward the deck and substantially anchoring the same thereon.

In Fig. 10 of the drawings, I have shown the cabin 61 as spaced below the plane surface or deck 62, and the whole of the deck 62 as reticulated, and the airfoils 63 as extending the whole distance across the aircraft above the cabin 61. In this modified construction, it will be noted that the upper portion of the cabin is so constructed as to reduce the head resistance of the aircraft during its ascent.

The modified structure shown in Fig. 10 is preferably adapted for conveying freight from place to place and may not be as readily adaptable to carrying, launching, and receiving other aircraft on its upper deck.

Though I have shown and described a particular construction, combination, and arrangement of parts and portions, and certain modifications thereof, I do not wish to be limited to the same, but desire to include in the scope of my invention the construction, combination, and arrangement substantially as set forth in the appended claims.

I claim:

1. In an aircraft, a long fore and aft body, a plurality of propellers located at and spaced from the sides of the body, said propellers being pivotally mounted on axes transverse to the longitudinal extent of the body, means for shifting the rotating axes of the propellers from forwardly to upwardly directed positions, and a horizontal grating positioned above the propellers providing a substantially continuous airplane landing surface from bow to stern of the aircraft and laterally between the laterally outer edge portions of the grating.

2. In an aircraft, a long fore and aft body, a plurality of propellers located at and spaced from the sides of the body, said propellers being pivotally mounted on axes transverse to the longitudinal extent of the body, means for shifting the rotating axes of the propellers from forwardly to upwardly directed positions, and a horizontal grating positioned above the propellers and to the sides of and flush with the top of the body, providing a substantially continuous airplane landing surface from bow to stern of the aircraft and laterally between the laterally outer edge portions of the grating.

3. In an aircraft, a long fore and aft body, a plurality of propellers located at and spaced from the sides of the body, said propellers being pivotally mounted on axes transverse to the longitudinal extent of the body, means for shifting the rotating axes of the propellers from forwardly to upwardly directed positions, a horizontal grating positioned above the propellers, providing a substantially continuous airplane landing surface from bow to stern of the aircraft and laterally between the laterally outer edge portions of the grating, and a plurality of airfoils pivotally mounted above the propellers and below the grating on axes transverse to the longitudinal extent of the body, said airfoils being shiftable from substantially vertical positions to positions slightly inclined to the horizontal.

4. In an aircraft, a long fore and aft body, a plurality of propellers located at and spaced from the sides of the body, said propellers being pivotally mounted on axes transverse to the longitudinal extent of the body, a horizontal grating positioned above the propellers, providing a substantially continuous airplane landing surface from bow to stern of the aircraft and laterally between the laterally outer edge portions of the grating and an elevator extending from the body to the top of the horizontal grating.

5. In an aircraft, a long fore and aft body, a plurality of propellers located at and spaced from the sides of the body, said propellers being pivotally mounted on axes transverse to the longitudinal extent of the body, a horizontal grating positioned above the propellers and to the sides of and flush with the top of the body, providing a substantially continuous airplane landing surface from bow to stern of the aircraft and laterally between the laterally outer edge portions of the grating, and an elevator extending from the interior of the body to the top thereof.

6. In an aircraft, a body, a plurality of propellers located at and spaced from the sides of the body, a horizontal grating positioned above the propellers, providing a substantially continuous airplane landing surface from bow to stern of the aircraft, a plurality of airfoils pivotally mounted above the propellers and below the grating on axes transverse to the longitudinal axis of the body, said airfoils being shiftable from substantially vertical positions to positions inclined slightly to the horizontal, and wings hinged at one end of the lateral ends of the airfoils on axes parallel to the longitudinal axis of the body, said wings being adapted to extend laterally in substantially horizontal directions beyond the ends of the airfoils, said wings being collapsible downwardly about their hinged axes to substantially vertical positions when not in use.

7. In an aircraft, a body, a plurality of propellers located at and placed from the sides of the body, a horizontal grating positioned above the propellers, providing a substantially continuous airplane landing surface from bow to stern of the aircraft and wings hinged on axes substantially parallel to the longitudinal axis of the body, and on the lateral edge portions of the grating, said wings being adapted to extend outwardly in substantially horizontal positions and adapted to fold downwardly about their hinged axes to substantially vertical positions when not in use.

8. In an aircraft of the class described, a body, means for propelling the same, a horizontal grating positioned at the upper end of the body, said grating comprising a plurality of relatively narrow bars positioned edgewise and extending lengthwise substantially parallel to the longitudinal axis of the body, and a plurality of diagonal reinforcing members extending between the bars, said diagonal members being wide and inclined upwardly from their rear to their forward edges.

9. In an aircraft, a long fore and aft body, means for propelling the same, a horizontal grating positioned to the side of and flush with the top of the body, said grating comprising a plurality of relatively narrow bars positioned edgewise and extending lengthwise substantially parallel to the longitudinal axis of the body, and a plurality of diagonal reinforcing members extending between the bars, said diagonal members being wide and inclined upwardly from their rear to their forward edges.

10. In an aircraft, a long foraminous wing, a cabin spaced below said wing, and airfoils positioned between the wing and the cabin and extending between the lateral portions of said wing, said airfoils being pivotally mounted on axes transverse to the longitudinal axis of the cabin, and means for propelling the aircraft.

11. In an aircraft, a body, a plurality of propellers located at and spaced from the sides of the body, a horizontal grating positioned above the propellers, providing a substantially continuous airplane landing surface from bow to stern of the aircraft, and a plurality of airfoils mounted above the propellers and below the grating and transversely with respect to the longitudinal axis of the body.

EDGAR A. LOBACK.